United States Patent
Kurabayashi

(10) Patent No.: US 9,444,797 B2
(45) Date of Patent: Sep. 13, 2016

(54) PROTECTION OF PRIVATE DATA

(71) Applicant: Empire Technology Development LLC, Wilmington, DE (US)

(72) Inventor: Shuichi Kurabayashi, Fujisawa (JP)

(73) Assignee: Empire Technology Development LLC, Wilmington, DE (US)

( * ) Notice: Subject to any disclaimer, the term of this patent is extended or adjusted under 35 U.S.C. 154(b) by 51 days.

(21) Appl. No.: 14/327,814

(22) Filed: Jul. 10, 2014

(65) Prior Publication Data

US 2016/0014094 A1    Jan. 14, 2016

(51) Int. Cl.
*H04L 29/06* (2006.01)
*H04L 12/58* (2006.01)
*G06F 17/30* (2006.01)

(52) U.S. Cl.
CPC ....... *H04L 63/0428* (2013.01); *G06F 17/3053* (2013.01); *H04L 51/046* (2013.01)

(58) Field of Classification Search
CPC .............. H04L 63/0428; H04L 29/06639; H04L 61/2539; H04L 2209/16
See application file for complete search history.

(56) References Cited

U.S. PATENT DOCUMENTS

| | | | |
|---|---|---|---|
| 8,700,991 B1* | 4/2014 | Gigliotti | G06F 21/84 705/51 |
| 2004/0064438 A1* | 4/2004 | Kostoff | G06F 17/30705 |
| 2009/0018820 A1* | 1/2009 | Sato | G06F 21/6245 704/9 |
| 2010/0023509 A1* | 1/2010 | Adachi | G06F 17/30864 707/E17.014 |
| 2011/0320437 A1* | 12/2011 | Kim | G06F 17/30522 707/722 |
| 2012/0209828 A1* | 8/2012 | Takenaka | G06F 17/30563 707/710 |
| 2012/0284299 A1 | 11/2012 | Ishikawa et al. | |
| 2012/0303661 A1* | 11/2012 | Blohm | G06F 17/278 707/776 |
| 2013/0283384 A1* | 10/2013 | Jiang | G06F 21/10 726/26 |
| 2014/0298112 A1* | 10/2014 | Otsuka | G06F 11/3452 714/47.3 |
| 2015/0154294 A1* | 6/2015 | Kamdar | G06Q 30/02 707/709 |

OTHER PUBLICATIONS

Zhang et al, Time Series Pattern Based Noise Generation Strategy for Privacy Protection in Cloud Computing, Proceedings of the 2012 IEEE/ACM International Symposium on Cluster, Cloud and Grid computing, May 2012, ccgrid2012.*

Lakhotia et al., Context-Sensitive Analysis of Obfuscated x86 Executables, Proceeedings of the 2010 ACM SIGPLAN, Jan. 2010.*

(Continued)

*Primary Examiner* — Roderick Tolentino
*Assistant Examiner* — Harvey Cohen
(74) *Attorney, Agent, or Firm* — Brundidge & Stanger, P.C.

(57) ABSTRACT

Technologies are generally described for generating obfuscated message data. In some examples, a method performed under control of a server may include calculating co-occurrence probabilities of a plurality of combinations, each of which includes at least two elements that are included in original message data; extracting, from the original message data, a first data set that includes at least one combination that has a first co-occurrence probability from among the plurality of combinations and a second data set that includes at least one combination that has a second co-occurrence probability from among the plurality of combinations; generating dummy data by using the first data set and the second data set; and adding the generated dummy data to the original message data to generate obfuscated message data.

18 Claims, 6 Drawing Sheets

(56) References Cited

OTHER PUBLICATIONS

Wightman et al., A location obfuscation technique for accuracy-restricted applications, IEEE Wireless Communications and Networking Conference, 2012, pp. 1829-1834.*

Yamauchi et al., Feature Co-occurrence Representation Based on Boosting for Object Detection, 2010, IEEE Computer Society Conference on Computer Vision and Pattern Recognition, pp. 31-38.*

"The state of social media_2012 Comscore report," Accessed at http://web.archive.org/web/20130627205808/http://www.slideshare.net/karanbhujbal/the-state-of-social-media2012-comscore-report, Accessed on Jun. 9, 2014, pp. 8.

Chen, T-S. et al., "A Novel Anti-data Mining Technique Based on Hierarchical Anti-clustering (HAC)," ISDA '08., Eighth International Conference on Intelligent Systems Design and Applications, Nov. 26-28, 2008, pp. 426-430.

Cheng, Z. et al., "You are where you tweet: a content-based approach to geo-locating twitter users," In Proceedings of the 19th ACM international conference on Information and knowledge management (CIKM 2010), pp. 759-768.

Eldon, E., "ComScore: Google+ Grows Worldwide Users From 65 Million in October to 67 Million in November," posted on Dec. 22, 2011, Accessed at http://web.archive.org/web/20131203014634/http://techcrunch.com/2011/12/22/googlesplus/?utm_source=feedburner&utm_medium=feed&utm_campaign=Feed%3A+Techcrunch+%28TechCrunch%29, Accessed on Jun. 9, 2014, pp. 10.

Haddadi, H. et al., "Targeted Advertising on the Handset: Privacy and Security Challenges," 2011, pp. 119-137.

Ho, A. et al., "Privacy protection issues in social networking sites," IEEE/ACS International Conference on Computer Systems and Applications (AICCSA 2009), May 10-13, 2009, pp. 271-278.

Kim, H. and Bonneau, J., "Privacy-Enhanced Public View for Social Graphs," Proceedings of the 2nd ACM workshop on Social web search and mining, 2009, pp. 41-48.

Kuroiwa, K. and Uda, R., "A low cost privacy protection method for SNS by using Bloom filter," In Proceedings of the 6th International Conference on Ubiquitous Information Management and Communication (ICUIMC 2012), ACM pp. 7.

Li, N. et al., "PrivBasis: Frequent Itemset Mining with Differential Privacy," PVLDB, vol. 5, No. 11, 2012, pp. 1340-1351.

Li, R. et al., "Towards social user profiling: unified and discriminative influence model for inferring home locations," In Proceedings of the 18th ACM SIGKDD international conference on Knowledge discovery and data mining (KDD '12), 2012, pp. 1023-1031.

Liu, K. et al., "A Survey of Attack Techniques on Privacy-Preserving Data Perturbation Methods," In C. Aggarwal & P. Yu (Eds.), Privacy-Preserving Data Mining SE—15, vol. 34, 2008, pp. 359-381.

Liu, Y. et al., "Analyzing facebook privacy settings: user expectations vs. reality," In Proceedings of the 2011 ACM SIGCOMM conference on Internet measurement conference (IMC 2011), pp. 61-70.

Madden, M. "Privacy management on social media sites," Pew Research Center's Internet & American Life Project, Feb. 24, 2012, pp. 1-20.

Pennacchiotti, M. and Popescu, A-M., "Democrats, republicans and starbucks afficionados: User classification in twitter," In KDD'11, 2011, pp. 430-438.

Rao, D. et al., "Classifying latent user attributes in twitter," In Proceedings of the 2nd international workshop on Search and mining usergenerated contents, 2010, pp. 37-44.

Samarati, P., "Protecting Respondents' Identities in Microdata Release," IEEE TKDE, vol. 13, No. 6, 2001, pp. 1010-1027.

Stanley, R.M.O. and Zaïane, O.R., "Privacy Preserving Frequent Itemset Mining," In Proceedings of the IEEE international conference on Privacy, security and data mining, vol. 14, pp. 43-54.

Sweeney, L. K., "Anonymity: A Model for Protecting Privacy," International Journal on Uncertainty, Fuzziness and Knowledge-based Systems, 2002, pp. 557-570.

Sweeney, L. K., "Anonymity: Achieving k-Anonymity Privacy Protection using Generalization and Suppresion," International Journal on Uncertainty, Fuzziness and Knowledge-based Systems, 2002, pp. 571-588.

Zhou, B. and Pei, J., "Preserving privacy in social networks against neighborhood attacks," Proceedings of IEEE 24th International Conference on Data Engineering 2008 (ICDE2008), pp. 506-515.

\* cited by examiner

US 9,444,797 B2

PROTECTION OF PRIVATE DATA

BACKGROUND

Data mining has received a great deal of attention as a technique for extracting knowledge or information from a large scale data, e.g., a group of SNS messages or content. To protect implicit privacy data in the large scale database against the data mining, methods for uniformly prohibiting public accesses to the data or uniformly encrypting the data have been provided. However, these methods do not satisfy demands of users to share the SNS messages or content that they themselves have posted on their SNS pages.

SUMMARY

In an example, a method performed under control of a server may include calculating co-occurrence probabilities of a plurality of combinations, each of which includes at least two elements that are included in original message data; extracting, from the original message data, a first data set that includes at least one combination that has a first co-occurrence probability from among the plurality of combinations and a second data set that includes at least one combination that has a second co-occurrence probability from among the plurality of combinations; generating dummy data by using the first data set and the second data set; and adding the generated dummy data to the original message data to generate obfuscated message data.

In another example, a server may include a calculator configured to calculate co-occurrence probabilities of a plurality of combinations, each of which includes at least two elements that are included in original message data; a data extractor configured to extract, from the original message data, a first data set that includes at least one combination that has a first co-occurrence probability from among the plurality of combinations and a second data set that includes at least one combination that has a second co-occurrence probability from among the plurality of combinations; a dummy data generator configured to generate dummy data by using the first data set and the second data set; and an obfuscated data generator configured to add the generated dummy data to the original message data to generate obfuscated message data.

In yet another example, a computer-readable storage medium having stored thereon computer-executable instructions that, in response to execution, may cause a server to perform operations including: calculating co-occurrence probabilities of a plurality of combinations, each of which includes at least two elements that are included in original message data; extracting, from the original message data, a first data set that includes at least one combination that has a first co-occurrence probability from among the plurality of combinations and a second data set that includes at least one combination that has a second co-occurrence probability from among the plurality of combinations; generating dummy data by using the first data set and the second data set; and adding the generated dummy data to the original message data to generate obfuscated message data.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE FIGURES

The foregoing and other features of this disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings, in which:

DETAILED DESCRIPTION

Figure 1:
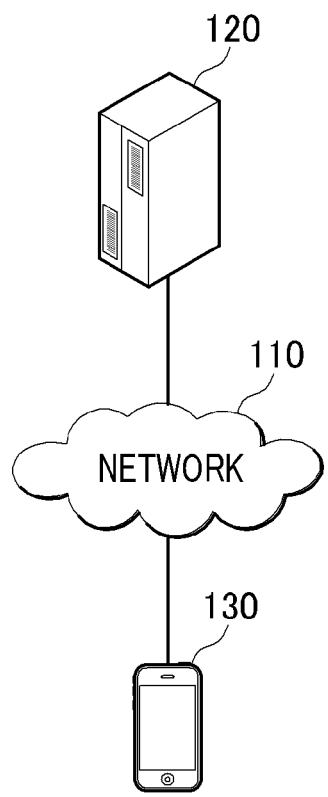
FIG. 1 schematically shows an illustrative example of an environment including a server and an end device, arranged in accordance with at least some embodiments described herein.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein. It will be readily understood that the aspects of the present disclosure, as generally described herein, and illustrated in the Figures, can be arranged, substituted, combined, separated, and designed in a wide variety of different configurations, all of which are explicitly contemplated herein.

This disclosure is generally drawn, inter alia, to methods, apparatuses, systems, devices, and computer program products related to an obfuscated message data generating scheme. Technologies are generally described for a method for generating dummy messages and combining the generated dummy messages with original message data so as to generate obfuscated message data. So, it is possible to intentionally manipulate and/or control co-occurrence probabilities of element combinations in the obfuscated message data, and to reduce an accuracy of data mining algorithm or technologies applied to the obfuscated message data.

In some examples, a server may be configured to calculate co-occurrence probabilities of multiple element combinations. Each of the multiple element combinations may include at least two elements that may be included in original message data. As non-limiting example, the original message data may include SNS messages or content that a user has posted on his/her SNS page. Non-limiting examples of the element may include at least one of one or more words in a message, time information in which the message is generated, or location information at which the message is generated. Co-occurrence probability of an element combination may refer to a probability that one element in the element combination and the other element in the element combination are to be included together in a message.

Further, the server may be configured to extract, from the original message data, a first data set that may include at least one element combination having a first co-occurrence probability from among the multiple element combinations. Further, the server may be configured to extract, from the original message data, a second data set that may include at least one element combination having a second co-occurrence probability from among the multiple element combinations. For example, but not as a limitation, the first co-occurrence probability may be ranked in from top 10 percent to top 20 percent of total co-occurrence probabilities of the multiple element combinations. Further, the second co-occurrence probability may be ranked in from top 40 percent to top 60 percent of the total co-occurrence probabilities of the multiple element combinations.

Further, the server may be configured to generate dummy data by using the extracted first data set and second data set. In some embodiments, the server may be configured to generate at least one first dummy element combination that may include the element included in the at least one element combination included in the first data set. The first dummy combination is not included in the first data set. Further, the server may be configured to generate at least one second dummy element combination that may include the same elements included in the at least one element combination included in the second data set.

Further, the server may be configured to generate dummy messages that may include the first dummy element combination and the second dummy element combination. Then, the server may be configured to add the generated dummy messages to the original message data, and to generate the obfuscated message data. In this regard, the server may be configured to reduce the first co-occurrence probability of the first data set by adding the first dummy element combination, and to increase the second co-occurrence probability of the second data set by adding the second dummy element combination. Thus, the server may be configured to reduce an accuracy of data mining technologies that are applied to the obfuscated message data and use co-occurrence probabilities of combinations in the original message data. Accordingly, it is possible to protect private data of user, such as residence, gender, age, religion, ethnic group, political orientation, etc, and to prohibit estimation of the private data from the original message data, such as the SNS messages.

FIG. 1 schematically shows an illustrative example of an environment 10 including a server 120 and an end device 130, arranged in accordance with at least some embodiments described herein. As illustrated in FIG. 1, server 120 and end device 130 may be communicatively connected to each other via a network 110.

Network 110 may include, as non-limiting examples, wireless networks such as a mobile radio communication network, including at least one of a 3rd generation (3G) mobile telecommunications network, a 4th or 5th generation mobile telecommunications network, various other mobile telecommunications networks, a satellite network, WiBro (Wireless Broadband Internet), Mobile WiMAX, HSDPA (High Speed Downlink Packet Access), Bluetooth, or the like.

As non-limiting examples, server 120 may refer to one or more apparatuses or servers hosted and/or supported by a service providing organization or entity that provides social networking services to multiple end devices including end device 130.

Server 120 may be configured to calculate co-occurrence probabilities of multiple element combinations. Each of the multiple element combinations may include at least two elements that may be included in original message data. As non-limiting example, the original message data may include SNS messages or content that a user has posted on his/her SNS page. Further, non-limiting examples of the element may include at least one of one or more words in a message, time information in which the message is generated, or location information, such as GPS coordinates, at which the message is generated. Co-occurrence probability of an element combination, for example, may refer to a probability that one element in the element combination and the other element in the element combination are included or exist together in a message.

In some embodiments, server 120 may be configured to calculate a co-occurrence probability associated with one element "A" and another element "B" by using the below formula 1. The co-occurrence probability associated with one element "A" and another element "B" may be calculated as the ratio of the element "A" to other elements that exist together with the element "B" in the original message data. In the formula 1, p(A, B) may refer to the co-occurrence probability associated with the element "A" and element "B". Further, freq(A, B) may refer to a frequency of co-occurrence of the element "A" and element "B". Further, C(B) may refer to a set or group of other elements that occur or exist together with the element "B".

$$p(A, B) = \frac{freq(A, B)}{\sum_{\forall x \in C(B)} freq(x, B)} \quad \text{[formula 1]}$$

Further, server 120 may be configured to extract, from the original message data, a first data set that may include at least one element combination having a first co-occurrence probability from among the multiple element combinations. Further, server 120 may be configured to extract, from the original message data, a second data set that may include at least one element combination having a second co-occurrence probability from among the multiple element combinations. For example, but not as a limitation, the first co-occurrence probability may be ranked in from top 10 percent to top 20 percent of total co-occurrence probabilities of the multiple element combinations. That is, the first data set may include relatively significant or important information or knowledge, since the element combinations included in the first data set frequently exist or appear in the original message data. Further, the second co-occurrence probability may be ranked in from top 40 percent to top 60 percent of the total co-occurrence probabilities of the multiple element combinations. That is, the second data set does not include significant information, since the element combinations included in the second data set exist or appear in the original message data with relatively less frequency.

Server 120 may be further configured to store the extracted first data set and second data set in a database.

Further, server 120 may be configured to generate dummy data by using the first data set and the second data set. In some embodiments, server 120 may be configured to generate first dummy data to reduce the first co-occurrence probability of the first data set by using the at least one element combination included in the first data set. Specifically, server 120 may be configured to select, from the original message data, at least one first dummy element combination. The first dummy element combination may include one of the at least two elements included in the at least one element combination in the first data set. Further, the first dummy element combination is not included in the first data set. For example, but not as a limitation, in case that the first data set includes an element combination that includes an element "A" and an element "B", server 120 may be configured to select a first dummy element combination that includes the element "A" and an element "C".

Further, server 120 may be configured to generate second dummy data to increase the second co-occurrence probability of the second data set by using the at least one element combination included in the second data set. Specifically, server 120 may be configured to select, from the original message data, at least one second dummy element combination. The second dummy element combination may include an element combination from among the at least one element combination included in the second data set. Thus, the second dummy element combination may include the same elements that are included in the at least one element combination included in the second data set. For example, but not as a limitation, in case that the second data set includes an element combination that includes an element "D" and an element "E", server 120 may be configured to select a second dummy element combination that includes the element "D" and the element "E".

Further, server 120 may be configured to add the generated dummy data to the original message data so as to generate obfuscated message data. The dummy data may include a dummy message. In some embodiments, server 120 may be configured to generate a first dummy message that may include the elements included in the first dummy element combination. As the above example, server 120 may be configured to generate a first dummy message that includes the element "A" and the element "C". Server 120 may be configured to generate the first dummy message by using a text generating template. For example, the text generating template in which place holders for elements to be inserted may be predefined, such as "I went to (element) at (element)". Further, server 120 may be configured to insert the element "A" and the element "C" into the text generating template to generate the first dummy message.

Further, server 120 may be configured to generate a second dummy message that may include the elements included in the second dummy element combination. As the above example, server 120 may be configured to generate a second dummy message that includes the element "D" and the element "E". Server 120 may be configured to generate the second dummy message by inserting the element "D" and the element "E" into the text generating template.

Further, server 120 may be configured to add at least one of the first dummy message or the second dummy message into the original message data, so that the obfuscated message data may be generated. Server 120 may be further configured to store the generated obfuscated message data. The obfuscated message data may also include SNS messages or content.

Further, server 120 may be configured to render the obfuscated message data to end device 130. In some embodiments, server 120 may be configured to render the obfuscated message data to a web browser that is installed on end device 130. Further, server 120 may be configured to generate a program file that may be configured to make the first dummy message and the second dummy message in the obfuscated message data that is rendered on the web browser invisible. Further, server 120 may be configured to transmit, to end device 130, the program file, along with the obfuscated message data. For example, but not as a limitation, the program file may be implemented in JavaScript. Further, server 120 may be configured to transfer and/or render, to end device 130, SNS messages (i.e., the obfuscated message data) in a JavaScript Object Notation (JSON) format or an Extensible Mark-up Language (XML) format via JSON or web socket protocol. The JavaScript program file may be configured to designate positions of the first dummy message and the second dummy message in a Document Object Model (DOM) that is used to display the first dummy message and the second dummy message on the web browser. Further the JavaScript program file may be configured to remove the DOM elements that correspond to the first dummy message and the second dummy message from a DOM tree. So, the JavaScript program file may be configured to make the first dummy message and the second dummy message invisible on the web browser.

End device 130 may be configured to receive, from server 120, the obfuscated message data that includes the original message data and the dummy data (e.g., the first dummy message and the second dummy message). Further, end device 130 may be configured to receive, from server 120, the program file that may be configured to make the dummy data invisible from the obfuscated message rendered on the web browser. The program file may be executed on end device 130, so, end device 130 may be configured to display only the original message data on a display that may be part of, or communicatively coupled to, end device 130. Thus, it is possible to prevent only applications of data mining to the original message data without decreasing the reliability and/or readability of the original message data, such as SNS messages, as viewed by a user of end device 130.

End device 130 may include, for example, but not as a limitation, a notebook computer, a personal computer, a smart phone, a digital camera, a tablet computer, a phablet device, or a personal communication terminal, such as PCS (Personal Communication System), GSM (Global System for Mobile communications), PDC (Personal Digital Cellular), PDA (Personal Digital Assistant), IMT (International Mobile Telecommunication)-2000, CDMA (Code Division Multiple Access)-2000, W-CDMA (W-Code Division Multiple Access) and WiBro (Wireless Broadband Internet) terminal.

Figure 2:
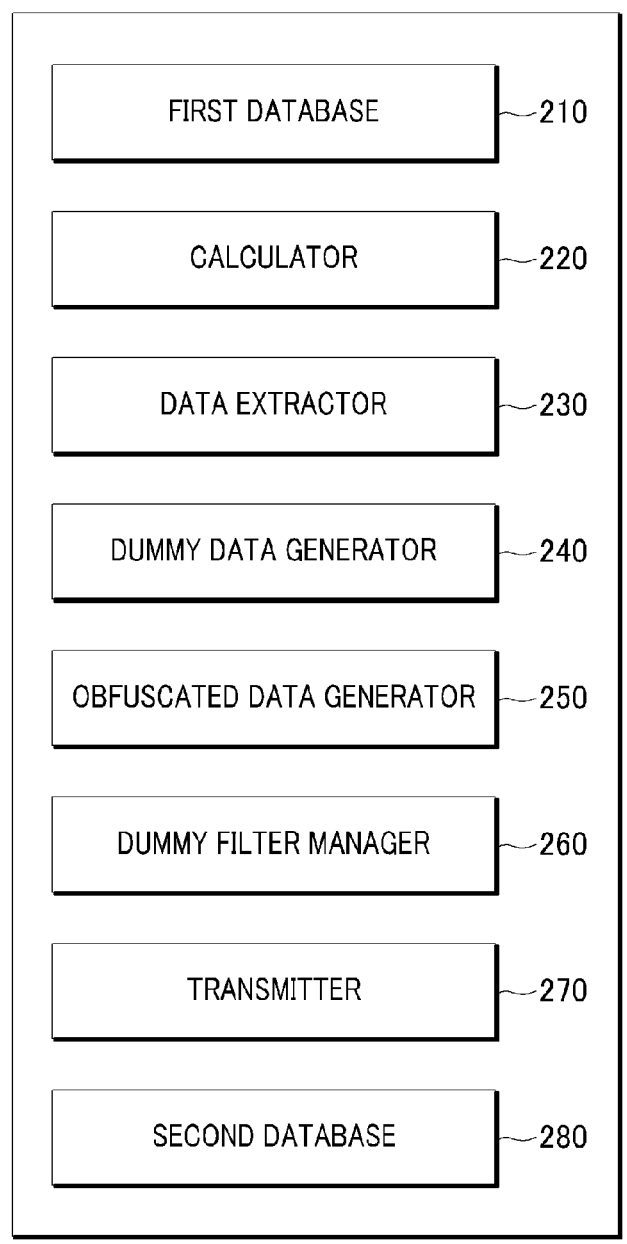
FIG. 2 shows a schematic block diagram illustrating an example architecture for a server, arranged in accordance with at least some embodiments described herein.

FIG. 2 shows a schematic block diagram illustrating an example architecture for a server, arranged in accordance with at least some embodiments described herein. As depicted in FIG. 2, server 120 may include a first database 210, a calculator 220, a data extractor 230, a dummy data generator 240, an obfuscated data generator 250, a dummy filter manager 260, a transmitter 270, and a second database 280. Although illustrated as discrete components, various components may be divided into additional components, combined into fewer components, or eliminated altogether while being contemplated within the scope of the disclosed subject matter. It will be understood by those skilled in the art that each function and/or operation of the components may be implemented, individually and/or collectively, by a wide range of hardware, software, firmware, or virtually any combination thereof. In that regard, one or more of first database 210, calculator 220, data extractor 230, dummy data generator 240, obfuscated data generator 250, dummy filter manager 260, transmitter 270, second database 280 may be included in an instance of an application hosted on server 120.

First database 210 may be configured to store original message data. As non-limiting examples, the original message data may include SNS messages or content that a user has posted on his/her SNS page. The original message data may include multiple elements. Non-limiting examples of the elements may include at least one of one or more words in a message, time information in which the message is generated, or location information, such as GPS coordinates, at which the message is generated.

Calculator 220 may be configured to calculate co-occurrence probabilities of multiple element combinations. Each of the multiple element combinations may include at least two elements from among the multiple elements included in the original message data. Co-occurrence probability of an element combination, for example, may refer to a probability that one element in the element combination and the other element in the element combination are included or exist together in a message.

Data extractor 230 may be configured to extract, from the original message data, a first data set that may include at least one element combination having a first co-occurrence probability from among the multiple element combinations. Further, data extractor 230 may be configured to extract, from the original message data, a second data set that may include at least one element combination having a second co-occurrence probability from among the multiple element combinations. For example, but not as a limitation, the first co-occurrence probability may be ranked in from top 10 percent to top 20 percent of total co-occurrence probabilities of the multiple element combinations. Further, the second co-occurrence probability may be ranked in from top 40 percent to top 60 percent of the total co-occurrence probabilities of the multiple element combinations.

Dummy data generator 240 may be configured to generate dummy data by using the first data set and the second data set. In some embodiments, dummy data generator 240 may be configured to generate first dummy data to reduce the first co-occurrence probability of the first data set based on the at least one element combination included in the first data set. Specifically, dummy data generator 240 may be configured to select, from the original message data, at least one first dummy element combination. The first dummy element combination may include one of the at least two elements included in the at least one element combination in the first data set. Further, the first dummy element combination is not included in the first data set. For example, but not as a limitation, in case that the first data set includes an element combination that includes an element "A" and an element "B", dummy data generator 240 may be configured to select a first dummy element combination that includes the element "A" and an element "C".

Further, dummy data generator 240 may be configured to generate second dummy data to increase the second co-occurrence probability of the second data set by using the at least one element combination included in the second data set. Specifically, dummy data generator 240 may be configured to select, from the original message data or the second data set, at least one second dummy element combination. The second dummy element combination may be an element combination from among the at least one element combination included in the second data set. Thus, the second dummy element combination may include the same elements that are included in the at least one element combination included in the second data set. For example, but not as a limitation, in case that the second data set includes an element combination that includes the element "B" and an element "E", dummy data generator 240 may be configured to select a second dummy element combination that includes the element "B" and the element "E". The element "B" is included in the element combination in the first data set. But the element "E" is not included in the element combination in the first data set, and included only in the element combination in the second data set.

Further, dummy data generator 240 may be configured to generate a first dummy message that may include the elements included in the first dummy element combination. As the above example, dummy data generator 240 may be configured to generate a first dummy message that includes the element "A" and the element "C". Dummy data generator 240 may be configured to generate the first dummy message by using a text generating template. For example, the text generating template in which place holders for elements to be inserted may be predefined, such as "I went to (element) at (element)". Further, dummy data generator 240 may be configured to insert the element "A" and the element "C" into the text generating template to generate the first dummy message.

Further, dummy data generator 240 may be configured to generate a second dummy message that may include the elements included in the second dummy element combination. As the above example, dummy data generator 240 may be configured to generate a second dummy message that includes the element "B" and the element "E". Dummy data generator 240 may be configured to generate the second dummy message by inserting the element "B" and the element "E" into the text generating template.

Obfuscated data generator 250 may be configured to add the generated dummy data to the original message data so as to generate obfuscated message data. The obfuscated message data may include SNS messages or content. Further, the dummy data may include the first dummy data including the first dummy message and the second dummy data including the second dummy message. Obfuscated data generator 250 may be configured to add at least one of the first dummy message or the second dummy message into the original message data.

Dummy filter manager 260 may be configured to generate a program file that may be configured to make the dummy data (i.e., the first dummy message and the second dummy message) in the obfuscated message data invisible. For example, but not as a limitation, the program file may be implemented in JavaScript.

Transmitter 270 may be configured to render the obfuscated message data to end device 130. In some embodiments, transmitter 270 may be configured to render the obfuscated message data to a web browser that is installed on end device 130. Further, transmitter 270 may be configured to transmit, to end device 130, the program file, along with the obfuscated message data.

Second database 280 may be configured to store the first data set and the second data set.

Figure 3:
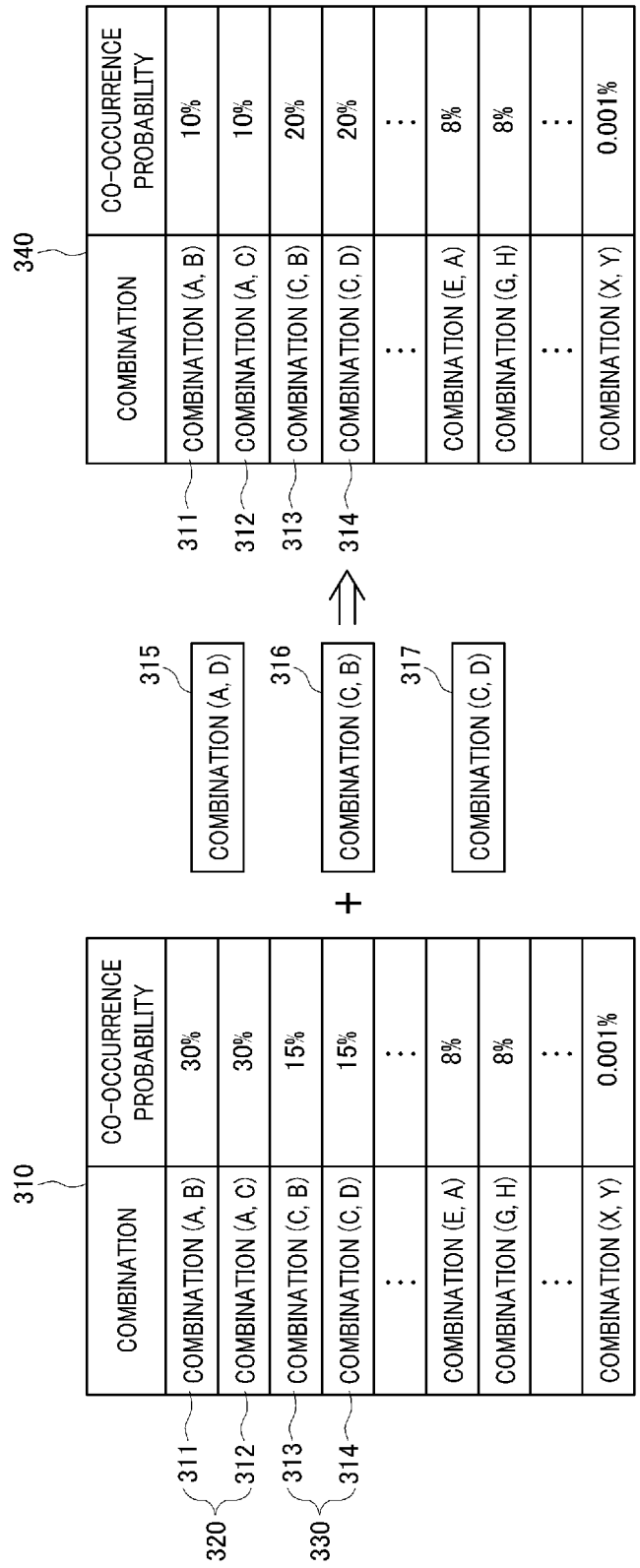
FIG. 3 schematically shows illustrative example original message data combinations and obfuscated message data combinations, arranged in accordance with at least some embodiments described herein.

FIG. 3 schematically shows illustrative example original message data combinations and obfuscated message data combinations, arranged in accordance with at least some embodiments described herein. As depicted in FIG. 3, original message data combinations 310 may include multiple element combinations. For example, original message data combinations 310 may include a first element combination 311 that includes an element "A" and an element "B". Further, first element combination 311 has a co-occurrence probability of thirty percent, which may be ranked in from top 10 percent to top 20 percent of total co-occurrence probabilities of the multiple element combinations. Further, original message data combinations 310 may include a second element combination 312 that includes the element "A" and an element "C". Further, second element combination 312 has a co-occurrence probability of thirty percent, which may be ranked in from top 10 percent to top 20 percent of total co-occurrence probabilities of the multiple element combinations. Further, original message data combinations 310 may include a third element combination 313 that includes the element "C" and the element "B". Further, third element combination 313 has a co-occurrence probability of fifteen percent, which may be ranked in from top 40 percent to top 60 percent of total co-occurrence probabilities of the multiple element combinations. Further, original message data combinations 310 may include a fourth element combination 314 that includes the element "C" and an element "D". Further, fourth element combination 314 has a co-occurrence probability of fifteen percent, which may be ranked in from top 40 percent to top 60 percent of total co-occurrence probabilities of the multiple element combinations.

Server 120 may be configured to extract a first data set 320 that may include first element combination 311 and second element combination 312 having the co-occurrence probability ranked in from top 10 percent to top 20 percent of total co-occurrence probabilities of the multiple element combinations. Further, server 120 may be configured to extract a second data set 330 that may include third element combination 313 and fourth element combination 314 having the co-occurrence probability ranked in from top 40 percent to top 60 percent of total co-occurrence probabilities of the multiple element combinations.

Further, server 120 may be configured to generate and/or select at least one first dummy element combination to reduce the co-occurrence probability of first data set 320. The first dummy element combination may include one of the two elements included in first element combination 311 or second element combination 312 included in first data set 320. Further, the first dummy element combination is not included in first data set 320. For example, server 120 may be configured to select a first dummy element combination 315 that includes the element "A" and the element "D". The number of first dummy element combination to be generated and/or selected by server 120 may be changed.

Further, server 120 may be configured to generate and/or select at least one second dummy element combination to increase the co-occurrence probability of second data set 330. The second dummy element combination may be the same element combination included in second data set 330. Thus, the second dummy element combination may include the same elements that are included in third element combination 313 and/or fourth element combination 314 in second data set 330. For example, but not as a limitation, server 120 may be configured to select a second dummy element combination 316 that includes the element "C" and the element "B" and a third dummy element combination 317 that includes the element "C" and the element "D". The number of second dummy element combination to be generated and/or selected by server 120 may be changed.

Further, server 120 may be configured to add first dummy element combination 315, second dummy element combination 316, and third dummy element combination 317 to original message data combinations 310, so obfuscated message data combinations 340 may be generated. By adding first dummy element combination 315 including the element "A" and the element "D" and second dummy element combination 316 including the element "C" and the element "B", the co-occurrence probability of first element combination 311 including the element "A" and the element "B" may be reduced from thirty percent to ten percent. Further, by adding first dummy element combination 315 including the element "A" and the element "D", second dummy element combination 316 including the element "C" and the element "B", and third dummy element combination 317 including the element "C" and the element "D", the co-occurrence probability of second element combination 312 including the element "A" and the element "C" may be reduced from thirty percent to ten percent. Further, by adding second dummy element combination 316 including the element "C" and the element "B", the co-occurrence probability of third element combination 313 including the element "C" and the element "B" may be increased from fifteen percent to twenty percent. Further, by adding third dummy element combination 317 including the element "C" and the element "D", the co-occurrence probability of fourth element combination 314 including the element "C" and the element "D" may be increased from fifteen percent to twenty percent.

Accordingly, the co-occurrence probability of first data set 320 that may include relatively significant or important information or knowledge may be reduced. Further, the co-occurrence probability of second data set 330 that may not include significant or important information or knowledge may be increased. Thus, an accuracy of data mining algorithm or technologies applied to obfuscated message data may be reduced.

Figure 4:
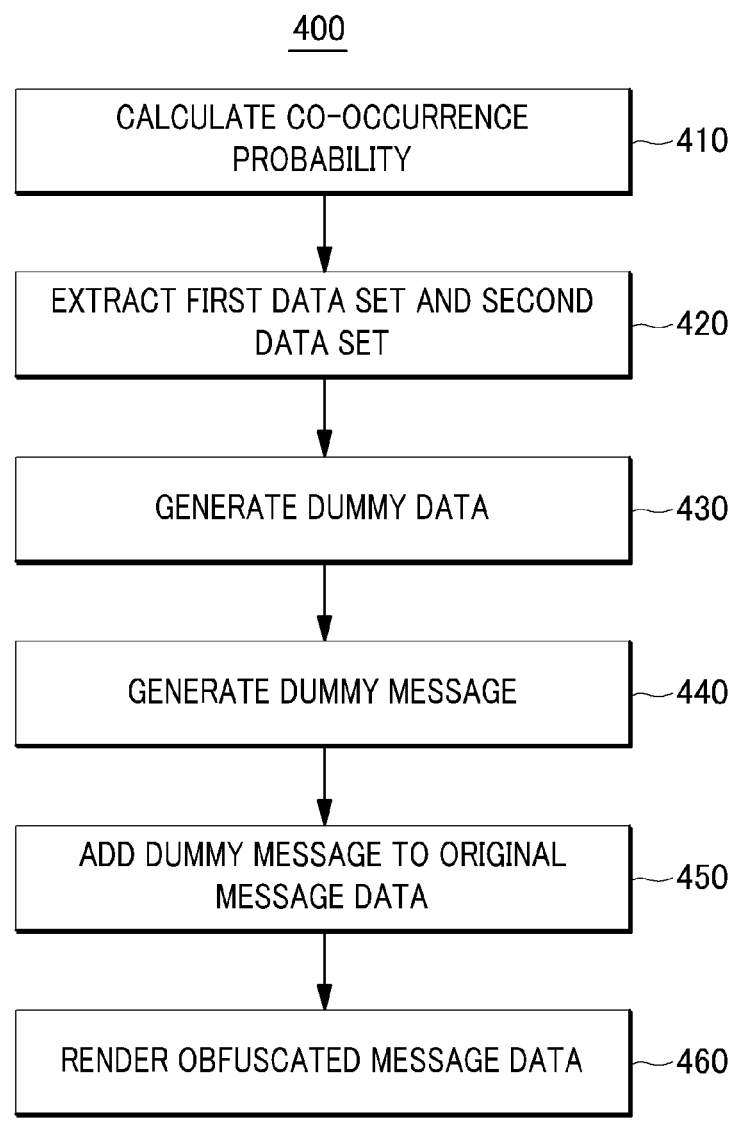
FIG. 4 schematically shows an example flow diagram of a process of a server for generating obfuscated message data, arranged in accordance with at least some embodiments described herein.

FIG. 4 schematically shows an example flow diagram of a process of a server 120 for generating obfuscated message data, arranged in accordance with at least some embodiments described herein. The process in FIG. 4 may be implemented in environment 10 including server 120 and end device 130, as illustrated in FIG. 1. An example process may include one or more operations, actions, or functions as illustrated by one or more blocks 410, 420, 430, 440, 450 and/or 460. Although illustrated as discrete blocks, various blocks may be divided into additional blocks, combined into fewer blocks, or eliminated, depending on the desired implementation. Processing may begin at block 410.

At block 410 (Calculate Co-Occurrence Probability), server 120 may calculate co-occurrence probabilities of multiple element combinations. Each of the multiple element combinations may include at least two elements that may be included in original message data. As non-limiting example, the original message data may include SNS messages or content that a user has posted on his/her SNS page. Further, non-limiting examples of the element may include at least one of one or more words in a message, time information in which the message is generated, or location information, such as GPS coordinates, at which the message is generated. Processing may proceed from block 410 to block 420.

At block 420 (Extract First Data Set and Second Data Set), server 120 may extract, from the original message data, a first data set that may include at least one element combination having a first co-occurrence probability from among the multiple element combinations. Further, at block 420, server 120 may extract, from the original message data, a second data set that may include at least one element combination having a second co-occurrence probability from among the multiple element combinations. For example, but not as a limitation, the first co-occurrence probability may be ranked in from top 10 percent to top 20 percent of total co-occurrence probabilities of the multiple element combinations. Further, the second co-occurrence probability may be ranked in from top 40 percent to top 60 percent of the total co-occurrence probabilities of the multiple element combinations. Further, server 120 may store the extracted first data set and second data set in a database. Processing may proceed from block 420 to block 430.

At block 430 (Generate Dummy Data), server 120 may generate dummy data by using the first data set and the second data set. Specifically, server 120 may generate first dummy data to reduce the first co-occurrence probability of the first data set based on the at least one element combination included in the first data set. Specifically, server 120 may select, from the original message data, at least one first dummy element combination. The first dummy element combination may include one of the at least two elements included in the at least one element combination in the first data set. Further, the first dummy element combination is not included in the first data set. For example, but not as a limitation, in case that the first data set includes an element combination that includes an element "A" and an element "B", server 120 may select a first dummy element combination that includes the element "A" and an element "C".

Further, server 120 may generate second dummy data to increase the second co-occurrence probability of the second data set by using the at least one element combination included in the second data set. Specifically, server 120 may select, from the original message data, at least one second dummy element combination. The second dummy element combination may be the same an element combination from among the at least one element combination included in the second data set. Thus, the second dummy element combination may include the same elements that are included in the at least one element combination included in the second data set. For example, but not as a limitation, in case that the second data set includes an element combination that includes an element "D" and an element "E", server 120 may select a second dummy element combination that includes the element "D" and the element "E". Processing may proceed from block 430 to block 440.

At block 440 (Generate Dummy Message), server 120 may generate dummy messages based on the dummy data generated at block 430. Server 120 may generate a first dummy message that may include the elements included in the first dummy element combination. As the above example, server 120 may generate a first dummy message that includes the element "A" and the element "C". Server 120 may generate the first dummy message by inserting the elements (e.g., "A" and "C") into a text generating template.

Further, server 120 may generate a second dummy message that may include the elements included in the second dummy element combination. As the above example, server 120 may generate a second dummy message that includes the element "D" and the element "E". Server 120 may be configured to generate the second dummy message by inserting the element "D" and the element "E" into the text generating template. Processing may proceed from block 440 to block 450.

At block 450 (Add Dummy Message to Original Message Data), server 120 may add at least one of the first dummy message or the second dummy message into the original message data so as to generate obfuscated message data. Server 120 may store the generated obfuscated message data. The obfuscated message data may also include SNS messages or content. Processing may proceed from block 450 to block 460.

At block 460 (Render Obfuscated Message Data), server 120 may render the obfuscated message data generated at block 450 to end device 130. In some embodiments, server 120 may render the obfuscated message data to a web browser that is installed on end device 130. Further, in some embodiments, server 120 may generate a program file that may be configured to make the first dummy message and the second dummy message in the obfuscated message data invisible on the web browser. Further, server 120 may transmit, to end device 130, the program file, along with the obfuscated message data. For example, but not as a limitation, the program file may be implemented in JavaScript.

Then, end device 130 may receive, from server 120, the obfuscated message data that includes the original message data and the dummy data. Further, end device 130 may receive the program file that may be configured to make the dummy data invisible from the obfuscated message rendered on the web browser. The program file may be executed on end device 130, so, end device 130 may display only the original message data on a display that may be part of, or communicatively coupled to, end device 130. Thus, it is possible to prevent only applications of data mining to the original message data without decreasing the reliability and readability of the original message data.

One skilled in the art will appreciate that, for this and other processes and methods disclosed herein, the functions performed in the processes and methods may be implemented in differing order. Furthermore, the outlined steps and operations are only provided as examples, and some of the steps and operations may be optional, combined into fewer steps and operations, or expanded into additional steps and operations without detracting from the essence of the disclosed embodiments.

Figure 5:
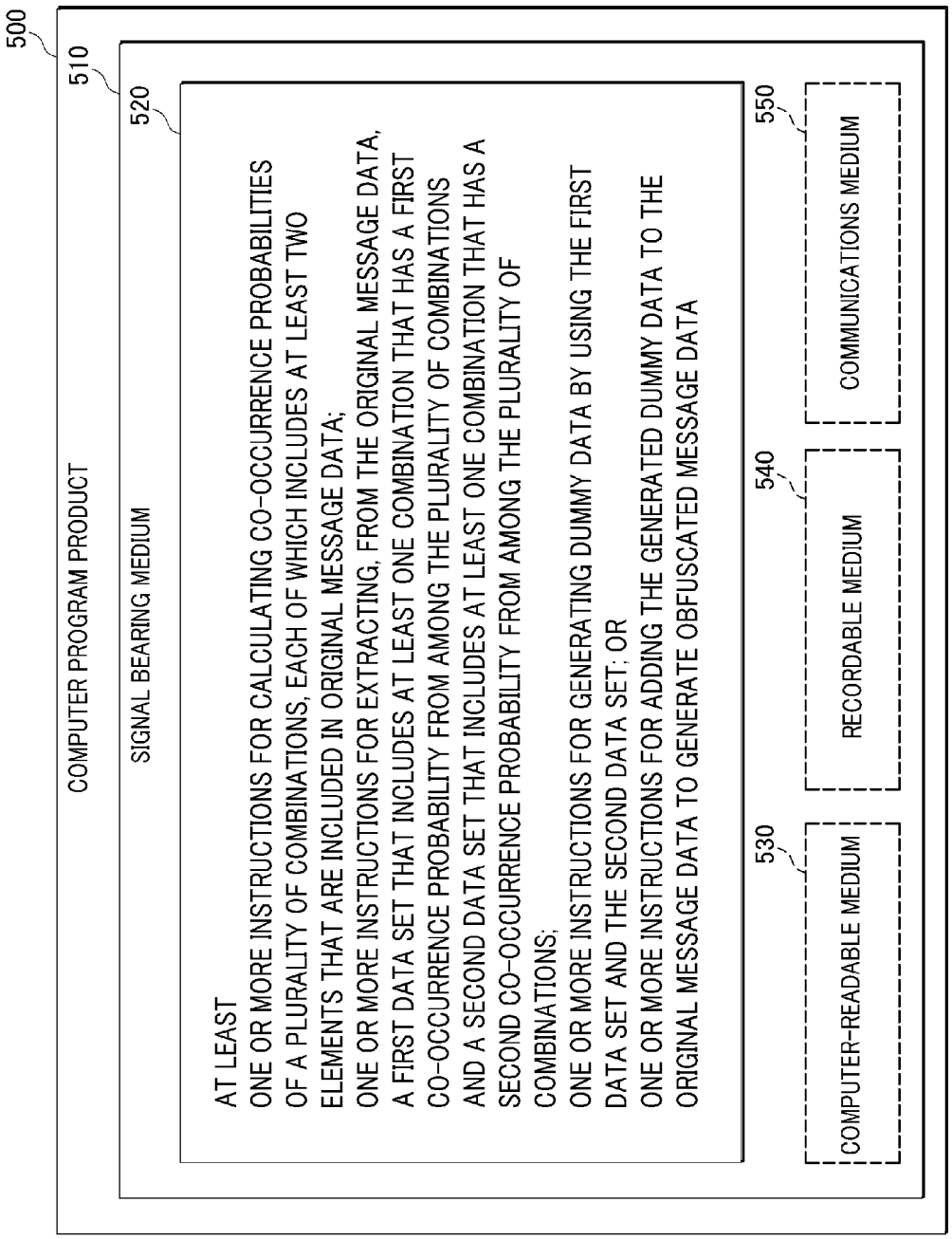
FIG. 5 illustrates a computer program product that may be utilized to provide an obfuscated message data generating scheme, arranged in accordance with at least some embodiments described herein.

FIG. 5 illustrates a computer program product that may be utilized to provide an obfuscated message data generating scheme, arranged in accordance with at least some embodiments described herein. Computer program product 500 may include a signal bearing medium 510. Signal bearing medium 510 may include one or more instructions 520 that, when executed by, for example, a processor, may provide the functionality described above with respect to FIGS. 1-4. By way of example, instructions 520 may include: one or more instructions for calculating co-occurrence probabilities of a plurality of combinations, each of which includes at least two elements that are included in original message data; one or more instructions for extracting, from the original message data, a first data set that includes at least one combination that has a first co-occurrence probability from among the plurality of combinations and a second data set that includes at least one combination that has a second co-occurrence probability from among the plurality of combinations; one or more instructions for generating dummy data by using the first data set and the second data set; or one or more instructions for adding the generated dummy data to the original message data to generate obfuscated message data. Thus, for example, referring to FIG. 2, server 120 may undertake one or more of the blocks shown in FIG. 4 in response to instructions 520.

In some implementations, signal bearing medium 510 may encompass a computer-readable medium 530, such as, but not limited to, a hard disk drive, a CD, a DVD, a digital tape, memory, etc. In some implementations, signal bearing medium 510 may encompass a recordable medium 540, such as, but not limited to, memory, read/write (R/W) CDs, R/W DVDs, etc. In some implementations, signal bearing medium 510 may encompass a communications medium 550, such as, but not limited to, a digital and/or an analog communication medium (e.g., a fiber optic cable, a waveguide, a wired communications link, a wireless communication link, etc.). Thus, for example, computer program product 500 may be conveyed to one or more modules of server 120 by an RF signal bearing medium 510, where the signal bearing medium 510 is conveyed by a wireless communications medium 550 (e.g., a wireless communications medium conforming with the IEEE 802.11 standard).

Figure 6:
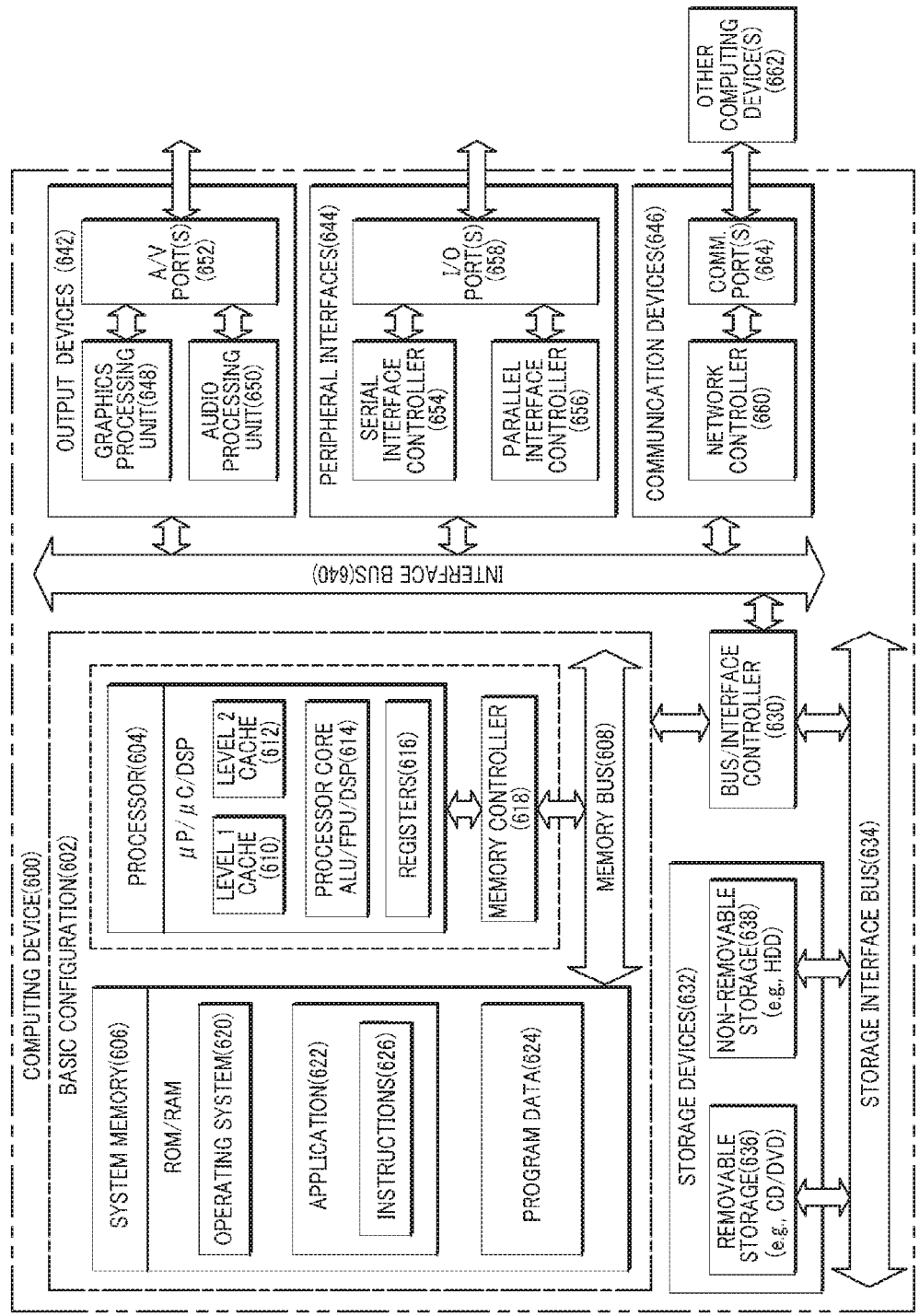
FIG. 6 is a block diagram illustrating an example computing device that may be utilized to provide an obfuscated message data generating scheme, arranged in accordance with at least some embodiments described herein.

FIG. 6 is a block diagram illustrating an example computing device that may be utilized to provide an obfuscated message data generating scheme, arranged in accordance with at least some embodiments described herein. In these examples, elements of computing device 600 may be arranged or configured for a device. In a very basic configuration 602, computing device 600 typically includes one or more processors 604 and a system memory 606. A memory bus 608 may be used for communicating between processor 604 and system memory 606.

Depending on the desired configuration, processor 604 may be of any type including but not limited to a microprocessor (μP), a microcontroller (μC), a digital signal processor (DSP), or any combination thereof. Processor 604 may include one more levels of caching, such as a level one cache 610 and a level two cache 612, a processor core 614, and registers 616. An example processor core 614 may include an arithmetic logic unit (ALU), a floating point unit (FPU), a digital signal processing core (DSP Core), or any combination thereof. An example memory controller 618 may also be used with processor 604, or in some implementations memory controller 618 may be an internal part of processor 604.

Depending on the desired configuration, system memory 606 may be of any type including but not limited to volatile memory (such as RAM), nonvolatile memory (such as ROM, flash memory, etc.) or any combination thereof. System memory 606 may include an operating system 620, an application 622, and program data 624. Application 622 may include instructions 626 that may be arranged to perform the functions as described herein including the actions described with respect to server 120 architecture as shown in FIG. 2 or including the actions described with respect to the flow charts shown in FIG. 4. In some examples, application 622 may be arranged to operate with program data 624 on an operating system 620 such that the schemes for generating obfuscated message data.

Computing device 600 may have additional features or functionality, and additional interfaces to facilitate communications between basic configuration 602 and any required devices and interfaces. For example, a bus/interface controller 630 may be used to facilitate communications between basic configuration 602 and one or more data storage devices 632 via a storage interface bus 634. Data storage devices 632 may be removable storage devices 636, non-removable storage devices 638, or a combination thereof. Examples of removable storage and non-removable storage devices include magnetic disk devices such as flexible disk drives and hard-disk drives (HDD), optical disk drives such as compact disk (CD) drives or digital versatile disk (DVD) drives, solid state drives (SSD), and tape drives to name a few. Example computer storage media may include volatile and nonvolatile, removable and non-removable media implemented in any method or technology for storage of information, such as computer readable instructions, data structures, program modules, or other data.

System memory 606, removable storage devices 636 and non-removable storage devices 638 are examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which may be used to store the desired information and which may be accessed by computing device 600. Any such computer storage media may be part of computing device 600.

Computing device 600 may also include an interface bus 640 for facilitating communication from various interface devices (e.g., output devices 642, peripheral interfaces 644, and communication devices 646) to basic configuration 602 via bus/interface controller 630. Example output devices 642 include a graphics processing unit 648 and an audio processing unit 650, which may be configured to communicate to various external devices such as a display or speakers via one or more A/V ports 652. Example peripheral interfaces 644 include a serial interface controller 654 or a parallel interface controller 656, which may be configured to communicate with external devices such as input devices (e.g., keyboard, mouse, pen, voice input device, touch input device, etc.) or other peripheral devices (e.g., printer, scanner, etc.) via one or more I/O ports 658. An example communication device 646 includes a network controller 660, which may be arranged to facilitate communications with one or more other computing devices 662 over a network communication link via one or more communication ports 664.

The network communication link may be one example of a communication media. Communication media may typically be embodied by computer readable instructions, data structures, program modules, or other data in a modulated data signal, such as a carrier wave or other transport mechanism, and may include any information delivery media. A "modulated data signal" may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), microwave, infrared (IR) and other wireless media. The term computer readable media as used herein may include both storage media and communication media.

Computing device 600 may be implemented as a portion of a small-form factor portable (or mobile) electronic device such as a cell phone, a personal data assistant (PDA), a personal media player device, a wireless web-watch device, a personal headset device, an application specific device, or a hybrid device that include any of the above functions. Computing device 600 may also be implemented as a personal computer including both laptop computer and non-laptop computer configurations.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds, compositions or biological systems, which can, of course, vary. It is also to be understood that the terminology used herein is for the purpose of describing particular embodiments only, and is not intended to be limiting.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," and the like include the number recited and refer to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

From the foregoing, it will be appreciated that various embodiments of the present disclosure have been described herein for purposes of illustration, and that various modifications may be made without departing from the scope and spirit of the present disclosure. Accordingly, the various embodiments disclosed herein are not intended to be limiting, with the true scope and spirit being indicated by the following claims.

What is claimed is:

1. A method performed under control of a server, comprising:
    calculating co-occurrence probabilities of a plurality of combinations, each of which includes at least two elements that are included in original message data;
    extracting, from the original message data, a first data set that includes at least one combination that has a first co-occurrence probability from among the plurality of combinations and a second data set that includes at least one combination that has a second co-occurrence probability from among the plurality of combinations;
    generating first dummy data by using the first data set and second dummy data by using the second data set, the first dummy data reduces the first co-occurrence probability of the first data set and the second dummy data increases the second co-occurrence probability of the second data set;
    adding the generated first dummy data and second dummy data to the original message data to generate obfuscated message data;
    rendering the obfuscated message data to a web browser that is installed on an end device; and
    transmitting, to the end device, a program file that makes the first dummy data and second dummy data invisible from the obfuscated message rendered on the web browser,
    wherein the first co-occurrence probability is ranked in from top 10 percent to top 20 percent of the co-occurrence probabilities, and
    wherein the second co-occurrence probability is ranked in from top 40 percent to top 60 percent of the co-occurrence probabilities.

2. The method of claim 1, wherein the generating the second dummy data includes:
    a combination from among the at least one combination included in the second data set.

3. The method of claim 2, wherein the generating of the first dummy data includes:
    selecting, from the original message data, a dummy combination that includes one of the at least two elements included in the at least one combination included in the first data set, and
    wherein the dummy combination is not included in the first data set.

4. The method of claim 3, wherein the first dummy data includes a dummy message, and
    wherein the generating of the first dummy data further includes:
    generating the dummy message that includes at least two elements included in the dummy combination by using a text generating template.

5. The method of claim 1, wherein the at least two elements includes words in a message and at least one of time information in which the message is generated, or location information at which the message is generated.

6. A server, comprising:
a processor; and
a non-transitory memory coupled to the processor, wherein the non-transitory memory stores program instructions executable by the processor to cause the system to perform operations comprising:
calculating co-occurrence probabilities of a plurality of combinations, each of which includes at least two elements that are included in original message data;
extracting, from the original message data, a first data set that includes at least one combination that has a first co-occurrence probability from among the plurality of combinations and a second data set that includes at least one combination that has a second co-occurrence probability from among the plurality of combinations;
generating first dummy data by using the first data set and second the second data set by using the first data set, the first dummy data reduces the first co-occurrence probability of the first data set and the second dummy data increases the second co-occurrence probability of the second data set; and
adding the generated first dummy data and second dummy data to the original message data to generate obfuscated message data,
wherein the first co-occurrence probability is ranked in from top 10 percent to top 20 percent of the co-occurrence probabilities, and
wherein the second co-occurrence probability is ranked in from top 40 percent to top 60 percent of the co-occurrence probabilities.

7. The server of claim 6 wherein the operations further comprise:
rendering the obfuscated message data to a web browser that is installed on an end device.

8. The server of claim 7, wherein the operations further comprise:
generating a program file that makes the dummy data invisible from the obfuscated message rendered on the web browser, and
transmitting further transmits, to the end device, the program file.

9. The server of claim 6, wherein generating the second dummy data comprises:
generating a second dummy data that includes a combination from among the at least one combination included in the second data set.

10. The server of claim 9, wherein generating the first dummy data comprises generating the first dummy data by selecting, from the original message data, a dummy combination that includes one of the at least two elements included in the least one combination included in the first data set, and
wherein the dummy combination is not included in the first data set.

11. The server of claim 10, wherein the dummy data includes a dummy message, and
wherein generating the first dummy data comprises generating a dummy message that includes at least two elements included in the dummy combination by using a text generating template.

12. The server of claim 6, wherein the at least two elements includes one or more words in a message and at least one of time information in which the message is generated, or location information at which the message is generated.

13. The server of claim 6, further comprising:
a first database configured to store the original message data; and
a second database configured to store the first data set and the second data set.

14. A non-transitory computer-readable storage medium having stored thereon computer-executable instructions that, in response to execution, cause a server to perform operations, comprising:
calculating co-occurrence probabilities of a plurality of combinations, each of which includes at least two elements that are included in original message data;
extracting, from the original message data, a first data set that includes at least one combination that has a first co-occurrence probability from among the plurality of combinations and a second data set that includes at least one combination that has a second co-occurrence probability from among the plurality of combinations;
generating first dummy data by using the first data set and second dummy data by using the second data set, the first dummy data reduces the first co-occurrence probability of the first data set and the second dummy data increases the second co-occurrence probability of the second data set; and
adding the generated first dummy data and second dummy data to the original message data to generate obfuscated message data,
wherein the first co-occurrence probability is ranked in from top 10 percent to top 20 percent of the co-occurrence probabilities, and
wherein the second co-occurrence probability is ranked in from top 40 percent to top 60 percent of the co-occurrence probabilities.

15. The non-transitory computer-readable storage medium of claim 14, wherein the generating of the dummy data includes
generating a second dummy data that includes a combination from among the at least one combination included in the second data set.

16. The non-transitory computer-readable storage medium of claim 15, wherein the generating of the first dummy data includes:
selecting, from the original message data, a dummy combination that includes one of the at least two elements included in the least one combination included in the first data set, and
wherein the dummy combination is not included in the first data set.

17. The non-transitory computer readable storage medium of claim 16, wherein the dummy data includes a dummy message, and
wherein the generating of the first dummy data further includes generating the dummy message that includes at least two elements included in the dummy combination by using a text generating template.

18. The non-transitory computer readable storage medium of claim 14, wherein the generating the second dummy data includes a combination from among the at least one combination included in the second data set.

* * * * *

UNITED STATES PATENT AND TRADEMARK OFFICE
CERTIFICATE OF CORRECTION

PATENT NO. : 9,444,797 B2
APPLICATION NO. : 14/327814
DATED : September 13, 2016
INVENTOR(S) : Kurabayashi It is certified that error appears in the above-identified patent and that said Letters Patent is hereby corrected as shown below:

In the Claims

In Column 16, Line 50, in Claim 2, delete "includes:" and insert -- includes --, therefor.

In Column 17, Line 21, in Claim 6, delete "second the second data" and insert -- the second data --, therefor.

In Column 17, Line 35, in Claim 7, delete "claim 6" and insert -- claim 6, --, therefor.

Signed and Sealed this
Seventh Day of March, 2017

Michelle K. Lee
*Director of the United States Patent and Trademark Office*